(12) United States Patent
Peterson et al.

(10) Patent No.: US 7,747,728 B1
(45) Date of Patent: **\*Jun. 29, 2010**

(54) CENTRALIZED MANAGEMENT OF QUALITY OF SERVICE (QOS) INFORMATION FOR DATA FLOWS

(75) Inventors: Eric L. Peterson, Westford, MA (US); Brian M. Sullivan, Lexington, MA (US); Cristina M. Radulescu-Banu, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/195,808

(22) Filed: Aug. 21, 2008

Related U.S. Application Data

(63) Continuation of application No. 10/459,824, filed on Jun. 12, 2003, now Pat. No. 7,421,487.

(51) Int. Cl.
*G06F 15/173* (2006.01)
(52) U.S. Cl. ...................... 709/223; 709/238
(58) Field of Classification Search .................. 709/223
See application file for complete search history.

(56) References Cited

U.S. PATENT DOCUMENTS 6,941,465 B1   9/2005   Palekar et al.
2002/0071389 A1 *   6/2002   Seo ............................ 370/232
2003/0056092 A1   3/2003   Edgett et al.
2003/0056096 A1   3/2003   Albert et al.
2003/0152035 A1   8/2003   Pettit et al.
2003/0177221 A1 *   9/2003   Ould-Brahim et al. ...... 709/223

OTHER PUBLICATIONS

Heinanen, Juha "Radius/L2TP Based VPLS." Feb. 2003. Internet Engineering Task Force Draft, pp. 1-8. Retrieved from http://tools.ietf.org/id/draft-heinanen-radius-I2tp-vpls-00.txt on Aug. 30, 2007.

\* cited by examiner

*Primary Examiner*—Larry Donaghue
*Assistant Examiner*—Nicholas Taylor
(74) *Attorney, Agent, or Firm*—Shumaker & Sieffert, P.A.

(57) ABSTRACT

Techniques are described for centralized management of quality of service (QoS) characteristics of network data flows. A service management system maintains a database that associates access information, such as a username and password, with QoS information. A router or other network device associates a data flow with access information, and queries the service management system with the access information to obtain the QoS information. The router forwards data of the data flow in accordance with the QoS information obtained from the service management system. As the access information may be a username and password, an existing system, such as a Remote Authentication Dial-In User Service (RADIUS) system, may easily be adapted for use as the service management system. As a result, QoS information may easily be centrally managed for numerous routers or other network devices.

20 Claims, 4 Drawing Sheets ated contents of which is
CENTRALIZED MANAGEMENT OF QUALITY OF SERVICE (QOS) INFORMATION FOR DATA FLOWS This application is a continuation of U.S. application Ser. No. 10/459,824, filed Jun. 12, 2003, which issued as U.S. Pat. No. 7,421,487 on Sep. 2, 2008, the entire contents of which is incorporated herein by reference.

TECHNICAL FIELD

The invention relates to computer networks and, more particularly, to managing quality of service (QoS) information for data flows.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within the network, referred to as routers, maintain routing information that describes available routes through the network. Each route defines a path between two locations on the network. Upon receiving an incoming data packet, a router examines header information within the packet to identify the destination for the packet. Based on the header information, the router accesses the routing information, selects an appropriate route for the packet, and forwards the packet accordingly.

Virtual private networks (VPNs) are often used to securely share data over public network infrastructure, such as the Internet. For example, an enterprise that includes multiple geographically separated sites, each site including one or more computing devices, may establish a VPN to allow the computing devices to securely communicate through the Internet or other public network infrastructure.

In many situations, it is desirable to control the "Quality of Service" (QoS) that a router or other network device provides to a route or other network data flow associated with the VPN. In general, QoS refers to a level of communication throughput for the data flow, and typically specifies a defined bandwidth allocation and burst size. In order to control the QoS provided to a VPN route, the routers establishing the VPN often need to be manually configured. This process may be time consuming, and may require significant manual labor.

SUMMARY

In general, the invention is directed to techniques for centralized management of quality of service (QoS) information for network data flows. More specifically, a service management system maintains a database that associates access information, such as a username and password, with QoS information. When receiving routing information defining a new data flow, a router or other network device compares the routing information with selection criteria to associate the new data flow with a service profile identifier. The router may, for example, associate a service profile identifier, such as a service profile name or identification number, with the data flow based on the comparison. Based on the identifier, the router selects access information, such as a username and a password, queries the service management system to obtain QoS information for the new data flow.

The service management system authenticates the query from the router and provides the router with the QoS information corresponding to the service profile identifier and the access information associated with the data flow. As the access information may be a username and password, an existing system, such as a Remote Authentication Dial-In User Service (RADIUS) system, may easily be adapted for use as the service management system. As a result, QoS information may easily be centrally managed for numerous routers or other network devices.

The QoS information maintained by the service management system may include, for example, parameters for controlling an interface of the router, such as a dedicated bandwidth, latency, and error rate for the data flow. Upon receiving the QoS characteristics, the router forwards data of the data flow in accordance with the QoS information obtained from the service management system.

In some embodiments, the router may dynamically instantiate interfaces in accordance with the interface parameters obtained from the query to service management system. As a result, the techniques may be used to easily control the QoS characteristics of data flows that tend to be "dynamic", such as virtual private networks (VPN) routes, Multi-protocol Label Switching (MPLS) paths, IPsec tunnels, and the like.

In one embodiment, a method comprises maintaining, within a router, a data structure that associates routes through a network with access information for retrieving interface parameters from an external service management system. The method also includes receiving, with the router, a routing protocol packet from a second router, wherein the routing protocol packet includes routing information that specifies at least one route through the network and selecting, from the data structure, the access information associated with the route specified by the routing information. The method also includes querying the external service management system with the selected access information to obtain interface parameters for instantiating an interface and instantiating at least one interface within the router based on the interface parameters obtained from the external service management system. The method also includes forwarding data of a data flow associated with the route specified by the routing information with the at least one interface of the router that was instantiated using the interface parameters obtained from the external service management system.

In another embodiment, a network device comprises a control unit that maintains a data structure that associates routes through a network with access information for retrieving interface parameters from an external service management system. The control unit of the network device receives a routing protocol packet from a second router that includes routing information that specifies at least one route through the network, selects the access information associated with the route specified by the routing information, and queries the external service management system with the selected access information to obtain interface parameters for instantiating an interface. The network device also includes an interface through which the control unit forwards data of a data flow associated with the route specified in the routing information, wherein the interface is configured based on the interface parameters obtained from the external service management system.

The invention may provide one or more advantages. For example, the techniques allow routers or other network devices to dynamically obtain QoS information, including interface configuration characteristics, from a centralized location, e.g., a central database maintained by a RADIUS server. As a result, the techniques may achieve reduced administrative resources that otherwise would be necessary to manually configure interface configuration characteristics within the routers. Furthermore, the techniques provide for the central management of QoS characteristics of dynamic data flows, such as virtual private networks (VPN) routes, Multi-protocol Label Switching (MPLS) paths, IPsec tunnels, and the like.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
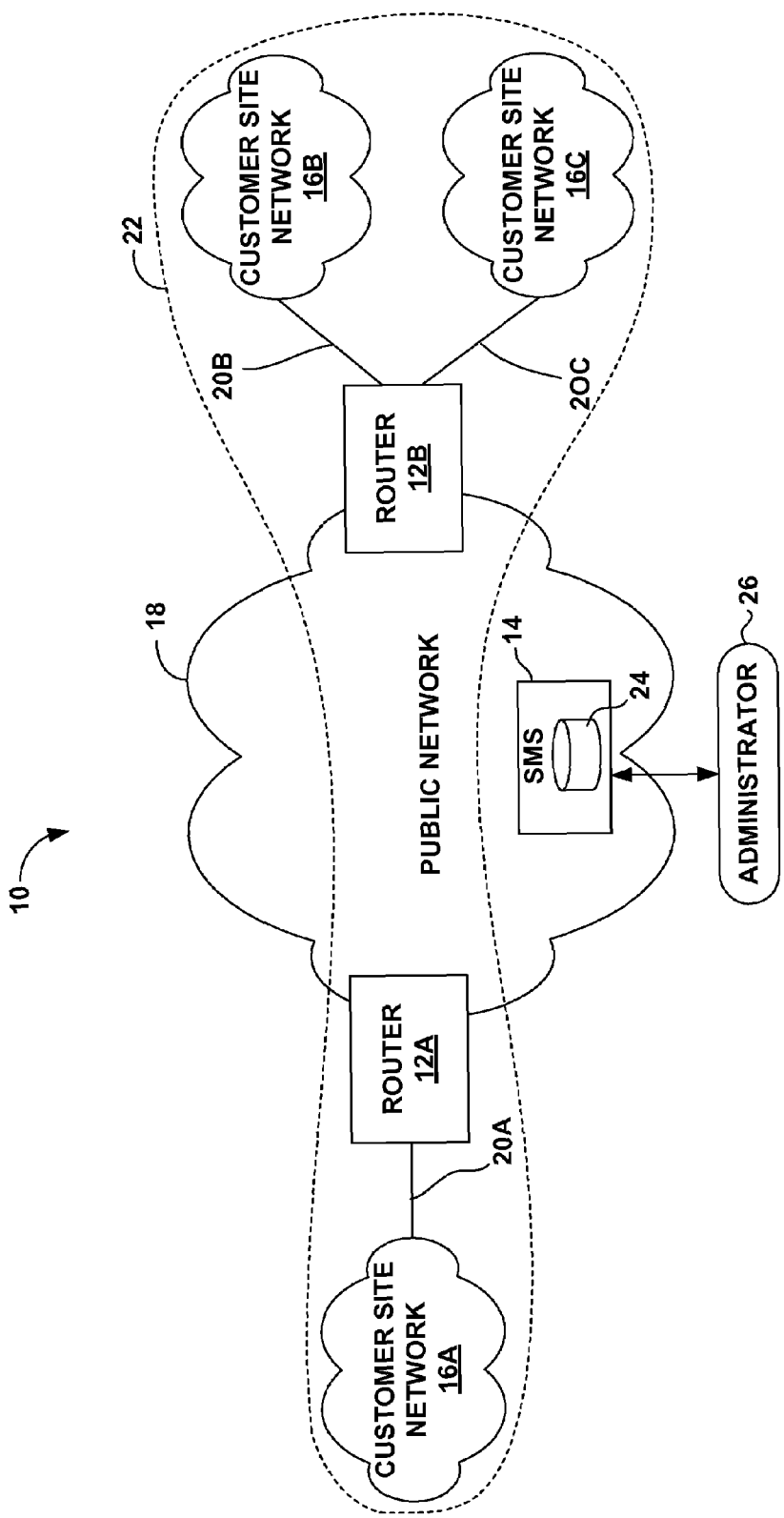
FIG. 1 is a block diagram illustrating a system in which routers query a service management system for interface parameters in accordance with the principles of the invention.

FIG. 1 is a block diagram illustrating a system 10 in which routers 12A and 12B ("routers 12") query a service management system (SMS) 14 for quality of service (QoS) information in accordance with the principles of the invention. Routers 12 may be any type of router, such as edge routers of a public network 18, as illustrated in FIG. 1. Alternatively, routers 12 may be core routers within public network 18, a provider network maintained by an Internet Service Provider (ISP), or a private network. Routers 12 couple customer site networks 16A-16C ("customer site networks 16") to public network 18. More specifically, router 12A couples customer site network 16A to public network 18, and router 12B couples customer site networks 16B and 16C to public network 18. Public network 18 includes one or more autonomous systems (not shown) having a number of devices, such as routers and switches, used to forward data across public network 18.

Customer site networks 16 may be geographically distributed sites of an enterprise. Each of customer site networks 16 includes one or more devices (not shown), such as personal computers, laptop computers, handheld computers, workstations, servers, routers, switches, printers, fax machines, or the like. Customer site networks 16 may include one or more Local Area Networks (LANs), Wide Area Network (WANs) or the like. Although system 10 may include any number of customer site networks 16 coupled to public network 18 by any number of routers 12, FIG. 1, for simplicity, shows only customer site networks 16 coupled to public network 18 by routers 12. Each of customer site networks 16 connects to a respective router 12 via one or more access links 20A-C ("access links 20").

Service management system (SMS) 14 may be a device that maintains a database 24 that describes QoS information for data flows through public network 18. Service management system 14 may be maintained by an ISP, and may be accessed by routers 12 via public network 18. Service management system 14 includes, for example, one or more Remote Authentication Dial-In User Service (RADIUS) servers that provides authentication services and access to database 24.

Service management system 14, and more particularly database 24, stores data that defines access information for a set of network users and associated QoS information. Database 24 may, for example, associate a username and password with a defined bandwidth allocation, latency, and error rate. When receiving routing information defining data flows within public network 18, routers 12 compare the routing information with selection criteria to associate the data flows with service profile identifiers. Based on the identifiers, routers 12 select access information, and query service management system 14 to obtain QoS information for the data flows. In this manner, routers 12 may retrieve QoS information from a centralized location external to routers 12, and forward data flows in accordance with the retrieved QoS information. The techniques reduce or eliminate the need for administrators to manually configure QoS characteristics for data flows of routers 12. As a result, the techniques may avoid significant administrative resources that otherwise would be necessary to manually maintain the QoS characteristics of data flows through routers 12.

In the example illustrated in FIG. 1, the techniques may be used to centrally manage the QoS characteristics of data flows associated with virtual private network (VPN) 22. In particular, routers 12 provide services for a virtual private network (VPN) 22. VPN 22 allows users within customer site networks 16 to securely communicate data flows across the shared public infrastructure of public network 18. Routers 12 may provide subsets of users within VPN 22 with different routing and forwarding policies. Router 12A may, for example, apply a first routing and forwarding policy for data flows destined for customer site network 16B, and apply a second routing and forwarding policy for data flows destined for customer site network 16C. The routing and forwarding policy applied to data flows destined for customer site network 16B may correspond to a QoS with a higher bandwidth allocation, reduced latency, and lower error rates than the QoS corresponding to the routing and forwarding policy applied to data flows destined for customer site network 16C.

In some embodiments, routers 12 may dynamically instantiate a logical interface and forward the data of the data flow via the interface. In general, a logical interface is instantiated automatically in response to a catalyst event and in accordance with the QoS information and, more specifically, interface parameters, received from service management system 14. The catalyst event may be matching of packet information to selection criteria. For purposes of forwarding and routing, routers 12 may treat the logical interfaces in a manner similar to physical interfaces to other network devices.

For example, in accordance with a routing protocol, router 12A may receive routing information that defines a data flow, such as a route within VPN 22. Router 12A compares routing information within the packet to selection criteria to associate a service profile identifier with the VPN route. The service profile identifier associated with the VPN route may correspond to access information such as a user name, a password, an Internet Protocol (IP) address of selection service center 14, and the like. Router 12A sends a query to service management system 14 that includes the access information corresponding to the service profile identifier associated with the VPN route.

Service management system 14 authenticates the query and returns QoS information, such as interface parameters, corresponding to the data flow. More particularly, service management system 14 compares access information, for example the username and password, with entries of database 24. When the access information matches an entry of database 24, service management system 14 retrieves corresponding QoS information, e.g., interface parameters, and relays the QoS information to querying router 12A. Router 12A instantiates a dynamic interface based on the QoS information to support the VPN route. In this manner, router 12A associates QoS information, such as interface parameters, stored in a centralized location external to router 12A with the dynamically instantiated interfaces and, more particularly, the data flows associated with the interfaces. Router 12A controls the QoS for data flows within VPN 22 based on the dynamic interface associated with the data flows.

In the same manner, router 12B may associate different QoS characteristics with data flows by querying service management system 14. For example, router 12B may maintain dynamic interfaces associated with customer site networks 16A and 16C. Router 12B may treat data flows of the dynamic interface associated with customer site network 16A with different QoS characteristics than data flows of the dynamic interface associated with customer site network 16B.

As a result, routers 12 may easily provide different QoS for data flows destined for different users or groups of users within customer site networks 16. For example, data flows of a dynamic interface associated with a first subset of users within customer site network 16B may have different QoS characteristics than data flows of a dynamic interface associated with a second subset of users within customer site network 16B. Further, one of routers 12 may provide services for a plurality of VPNs, and dynamically instantiate interfaces with different QoS characteristics for different VPNs, each individual VPN, subsets of users within each VPN, or the like.

Although FIG. 1 has been described in reference to a virtual private network, the techniques of the invention may be applied to other routing configurations. For example, the techniques may be applied to Multi-protocol Label Switching (MPLS) paths, IPSec tunnels, and other data flows that may be "dynamic" in nature. As another example, routers 12 may construct a plurality of data flows between one another using a reservation protocol such as Resource Reservation Setup Protocol (RSVP), and associate dynamically instantiated interfaces with the data flows. As described above, the QoS provided routers 12 can easily be centrally managed by service management system 14 in accordance with the principles of the invention. Moreover, although described in reference to a packet-based network, the techniques may be applied to a cell-based network, frame-based network, or other type of network.

Figure 2:
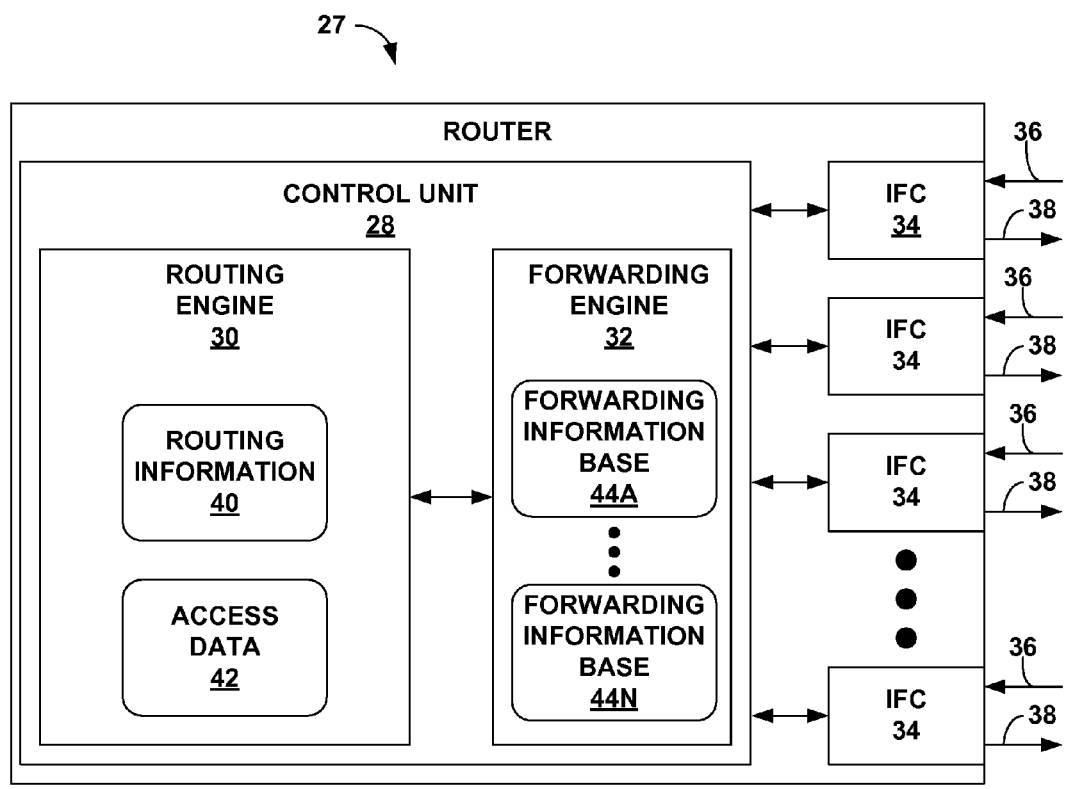
FIG. 2 is a block diagram illustrating an example router that queries the service management system of FIG. 1 to obtain interface parameters for dynamic instantiation of interfaces.

FIG. 2 is a block diagram illustrating an example embodiment of a router 27 that may forward data of a data flow in accordance with QoS information obtained from a service management system, such as service management system 14 of FIG. 1. In the illustrated embodiment, router 27 comprises a control unit 28 that includes a routing engine 30 and a forwarding engine 32. Router 27 further comprises one or more physical interface cards (IFCs) 34 that receive and send packets via network links 36 and 38, respectively. IFCs 34 are typically coupled to network links 36 and 38 via a number of interface ports.

Routing engine 30 is responsible for maintaining and updating routing information 40. Routing information 40 may describe a topology of a network, and more particularly, routes through the network. For example, routing information 40 may include, route data that describes various routes through the network, and also next hop data indicating appropriate neighboring devices within the network for each of the routes. Routing engine 30 periodically updates routing information 40 to accurately reflect the current network topology.

Routing engine 30 analyzes its stored routing information 40 and generates forwarding information for use by forwarding engine 32. Forwarding engine 32 stores the forwarding information in forwarding information bases 44A-44N ("forwarding information bases 44"). Forwarding information bases 44 may associate, for example, network destinations with specific next hops and corresponding IFCs 34. Forwarding information bases 44 is, therefore, based on routing information 40.

Forwarding engine 32 may maintain separate forwarding information bases 44 respectively associated with different VPNs as well as customer site networks 16 within a particular VPN. For instance, in the example of FIG. 1, router 27A may maintain separate forwarding information bases 44 for customer site networks 16A, 16B, and 16C. Separate forwarding information bases 44 for different customer site networks 16 within a VPN allows control unit 28 to select an appropriate forwarding information base 44 via policy instead of packet information matches. In other words, control unit 28 may select the appropriate forwarding information base 44 based on a mapping that maps an interface port to a forwarding information base 44. Further, separate forwarding information bases 44 for different customer site networks 16 allows customer site networks 16 associated with router 27 to use overlapping private address spaces.

As described, router 27 queries service management system 14 for QoS information for forwarding data of data flows. For example, the techniques of the invention may be used to obtain interface parameters for dynamic instantiation of interfaces. More specifically, router 27 may receive a routing protocol packet defining a new data flow, e.g., a new VPN route. Router 27 installs the VPN route into routing information 40 and, in turn, into a corresponding forwarding information base 44. For example, router 27 may select a respective forwarding information base 44 in accordance with the interface or port on which router 27 received the routing communication.

Routing engine 30 applies selection criteria to the packet to associate a service profile identifier with the VPN route. For example, routing engine 30 may apply a route map that compares packet information, such as a Border Gateway Protocol version 4 (BGP4) extended community, with the selection criteria. When the packet information matches the selection criteria, routing engine 30 associates a respective service profile identifier, such as a service profile name or identification number, with the route.

Based on the service profile identifier associated with the VPN route, routing engine 30 retrieves access information from access data 42. Access data 42 may, for example, store access information for a set of service profiles. For example, access data 42 may maintain access information for two service profiles having service profile identifiers "Gold" and "Silver." For each service profile, access data 42 defines respective access information, such as a username, password, or other authentication information, for retrieving respective quality of service information from service management system 14. The username may, for instance, be the same as the service profile identifier. Routing engine 30 stores access data 42 as one or more data structures on one or more computer-readable media, such as a magnetic medium, optical medium, non-volatile random access memory (NVRAM), FLASH memory, or the like. Routing engine 30 may maintain access data 42 in the form of a variety of data structures, such as tables, radix trees, flat files, and databases.

Upon retrieving the access information for the VPN route, routing engine 30 uses the access information to query service management system 14. Routing engine 30 may, for example, send a query to service management system 14 via a respective outbound link 38 and public network 18. The query to service management system 14 may include the access information corresponding to the service profile identifier associated with the VPN route, e.g., the username and password from access data 42.

In response, service management system 14 authenticates the query from routing engine 30, and returns QoS information. The QoS information may, for example, include such as a defined bandwidth allocation, latency, error rate or the like. The QoS information may also include interface parameters. Routing engine 30 may dynamically instantiate a logical interface that corresponds to the VPN route in accordance with the interface parameters received from service management system 14. Routing engine 30 may also update routing information 40 and, in turn, a corresponding forwarding information base 44 (FIG. 2) to associate the instantiated logical interface with the next hop for packets corresponding to the VPN route.

In similar fashion, routing engine 30 may dynamically instantiate other logical interfaces corresponding to other VPN routes in accordance with QoS information received in response to queries to service management system 14. For example, routing engine 30 may instantiate a first logical interface that has a first set of interface parameters for data flows of a first one of customer site networks 16, and a second logical interface that has a second set of interface parameters for data flows of a second one of customer site networks 16. In this manner, routing engine 30 may provide data flows of VPN 22 with different QoS characteristics.

Router 27 may operate according to executable instructions fetched from a computer-readable medium (not shown). Examples of such media include random access memory (RAM), read-only memory (ROM), non-volatile random access memory (NVRAM), electrically erasable programmable read-only memory (EEPROM), flash memory, and the like. The functions of router 27 may be implemented by executing the instructions of the computer-readable medium with one or more processors, discrete hardware circuitry, firmware, software executing on a programmable processor, or a combination of any of the above.

Figure 3:
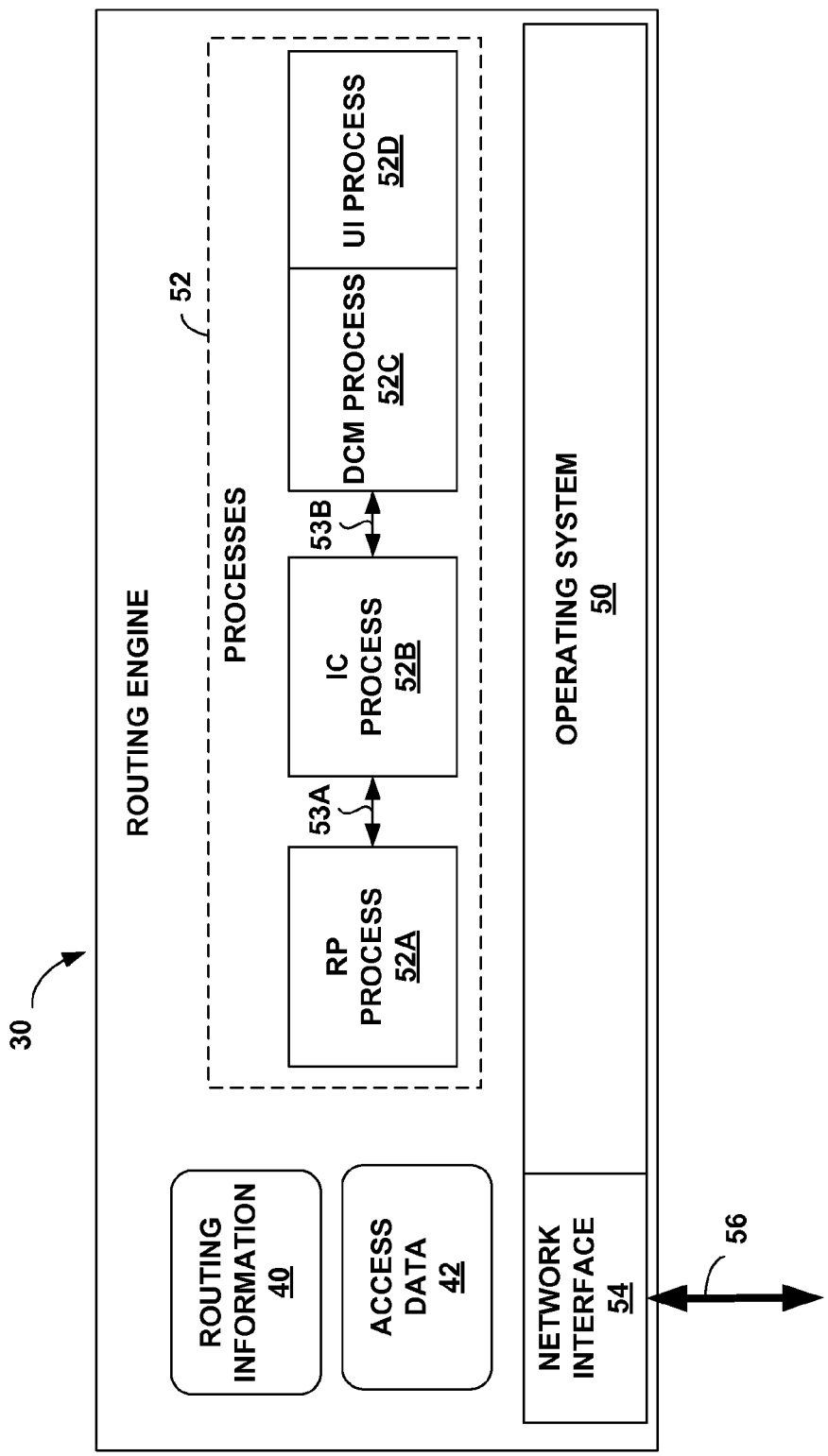
FIG. 3 is a block diagram illustrating an example routing engine of the example router of FIG. 2.

FIG. 3 is a block diagram illustrating an example routing engine 30 that retrieves QoS information for data flows from a centralized location in accordance with the principles of the invention. In the illustrated embodiment, routing engine 30 includes an operating system 50 that provides a multi-tasking operating environment for execution of a number of concurrent processes 52. Examples of such an operating system are JUNOSe™ (ERX) and JUNOS™ operating systems from Juniper Networks™, Inc. of Sunnyvale, Calif. Another example of such an operating system is FreeBSD, which is an advanced UNIX operating system that is compatible with a number of programmable processors, including processors commercially available from Intel Corporation™.

Processes 52 include a routing protocol (RP) process 52A that includes one or more threads that implement the various network protocols supported by routing engine 30. Routing protocol process 52A includes threads that implement protocols for exchanging route information with other routing devices and for updating routing information 40. Routing protocol process 52A may include, for example, threads that implement BGP, IP, RSVP, MPLS, and the like. Routing protocol process 52A may also include threads to support other protocols, such as threads that implement a Transmission Control Protocol/Internet Protocol (TCP/IP) network stack.

Processes 52 further include an interface creator (IC) process 52B and a dynamic configuration manager (DCM) process 52C. IC process 52B receives requests for instantiation of one or more logical interfaces from RP process 52A and collects any additional information needed for the instantiation operation. Upon obtaining all the information necessary for the instantiation operation, IC process 52B sends a request to DCM process 52C, which instantiates the respective logical interface in accordance with the information collected by IC process 52B.

RP process 52A and IC process 52B communicate via an interprocess communication channel 53A. More specifically, interprocess communication channel 53A allows RP process 52A and IC process 52B to exchange messages, parameter, indications and like. RP process 52A may, for example, send a request ordering IC process 52B to instantiate an interface instantiation operation. Likewise, IC process 52B and DCM process 52C communicate via interprocess communication channel 53B.

Processes 52 may also comprise a user interface (UI) process 52D that provides an interface by which a remote system administrator or script can control and configure routing engine 30. For example, a system administrator may configure access data 42 via a command line interface (CLI) presented by UI process 52D.

Routing engine 30 may further comprise a network interface 54 that provides a hardware interface for receiving and sending packets to forwarding engine 32 (FIG. 2). Network interface 54 may comprise, for example, a network interface card (NIC) coupled to IFCs 24 or forwarding engine 22 (FIG. 2) via link 56.

As described above, routing engine 30 queries a service management system 14 for QoS information. Specifically, routing engine 30 receives a routing protocol packet via network interface 54 and link 56. Routing engine 30 may, for example, receive a BGP packet for exchanging routing information among routers within a network. The BGP packet may, for instance, define a network data flow. RP process 52A may apply a route map to associate a service profile identifier with the data flow defined by the BGP packet. RP process 52A may, for example, apply a route map that compares BGP packet information, such as a BGP extended community, to selection criteria. RP process 52A associates a service profile identifier with the data flow defined by the BGP packet based on the results of the route map.

When the route map results in a match, RP process 52A queries service management system 14 with access information associated with the matching service profile identifier in order to obtain QoS information. In addition, RP process 52A may initiate an interface instantiation operation. In other words, the route map applied by RP process 52A may act as a catalyst event for dynamic instantiation of an interface. Specifically, when BGP packet information matches the selection criteria, i.e., the route map results in a match, RP process 52A associates a respective service profile identifier, such as a service profile name or identification number, and, in turn, access information with the data flow defined by the BGP packet. RP process 52A may, for example, retrieve access information corresponding to the service profile identifier from access data 42. As described above, the access information may include authentication information such as a username, a password, a domain and the like.

RP process 52A may send a request to instantiate a logical interface to IC process 52B. RP process 52A may include the access information corresponding to the service profile identifier from access data 42 in the request sent to IC process 52B. Alternatively, RP process 52A may send a request that only includes the service profile identifier and IC process 52B may have to retrieve access information associated with the service profile identifier from access data 42. The instantiation request may further include user-defined QoS information, e.g., interface parameters for forwarding the data flow.

IC process 52B collects any additional information for the instantiation operation. More specifically, IC process 52B queries a service management system 14 based on the access information. IC process 52B may, for example, query service management system 14 using a username and a password corresponding to the service profile identifier associated with the data flow. Service management system 14 authenticates the query based on the access information, e.g., username and password, and returns QoS information to IC process 52B based on the access information. In the case in which routing engine 30 instantiates a dynamic interface for the data flow, the QoS information may include interface parameters. In this manner, interface parameters of numerous interface configurations may be maintained in a centralized location, eliminating the need for administrators to manually configure interface parameters or other QoS for each router 12 within a network. As a result, the techniques may avoid significant administrative resources that otherwise would be necessary to manually maintain QoS characteristics within all the routers of the network.

IC process 52B sends a request to DCM process 52C that includes interface parameters obtained from service management system 14 along with any additional interface parameters specified in the instantiation request from RP process 52A. DCM process 52C instantiates a logical interface that includes all of the interface parameters indicated in the request form IC process 52B. DCM process 52C notifies IC process 52B upon completing the instantiation operation. IC process 52B relays the confirmation to RP process 52A.

Although in the example of FIG. 3 routing engine 30 implements the comparison of routing information to selection criteria, sends the queries to service management system 14 to obtain interface parameters, and instantiates the logical interfaces in accordance with received interface parameters, the tasks may be dispersed throughout the components of router 12 (FIG. 2). For example, a portion of the interface instantiation process may be implemented within forwarding engine 32 or IFCs 34. In other words, RP process 52A, IC process 52B and DCM process 52C may operate within routing engine 30, forwarding engine 32, IFCs 34, or a combination thereof.

Figure 4:
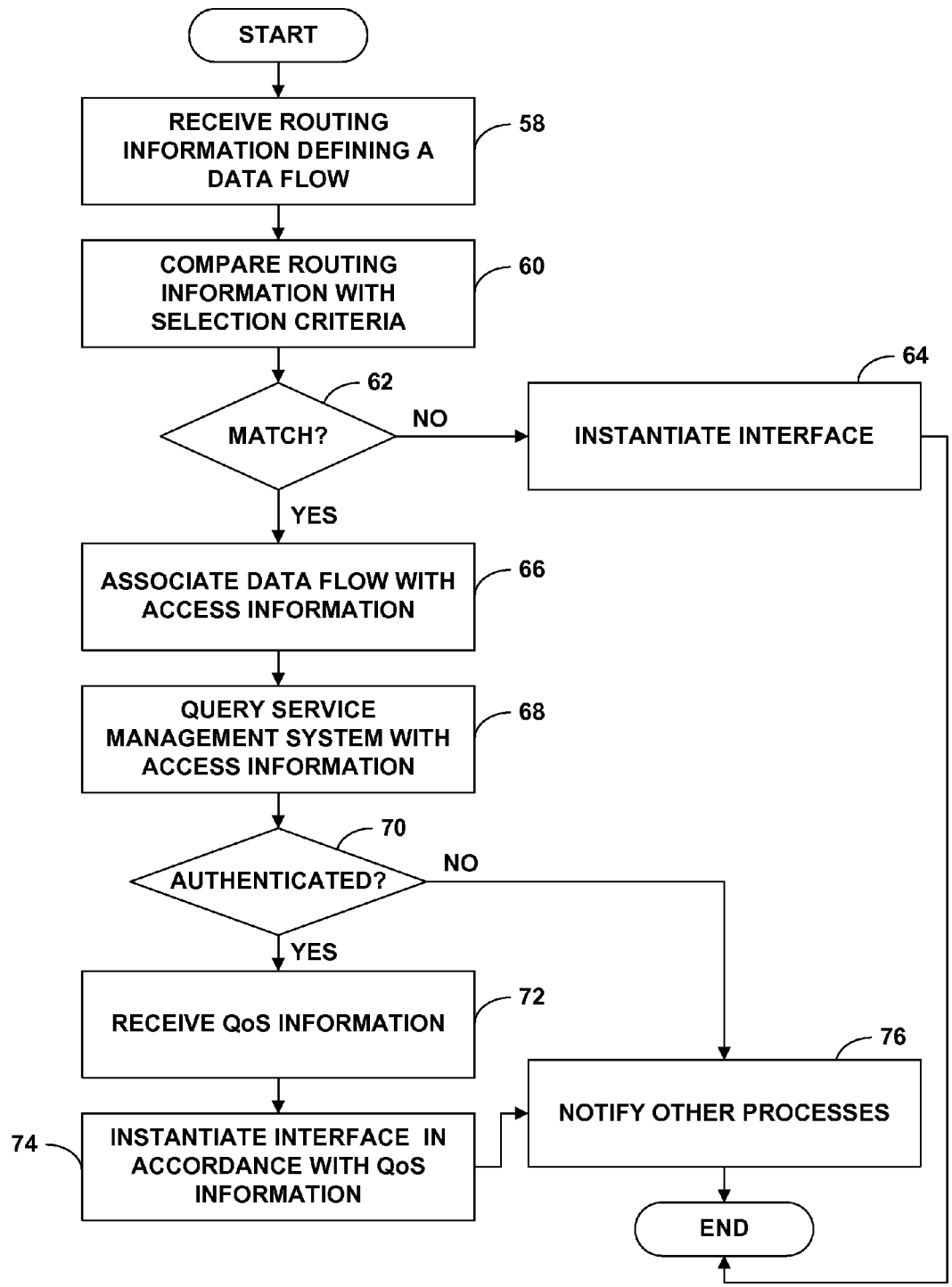
FIG. 4 is a flow diagram illustrating an exemplary mode of operation of the router of FIG. 2 when querying the service management system for interface parameters.

FIG. 4 is a flow diagram illustrating an exemplary mode of operation of router 27 when querying service management system 14 for QoS information. Router 27 initially receives a routing protocol packet, such as a BGP packet, that defines a data flow within a network (58). Router 27 may, for example, receive a routing protocol packet that defines a new data flow within a VPN, such as VPN 22 of FIG. 1. Next, router 27 and, more particularly RP process 52A, compares information in the routing communication with selection criteria (60). RP process 52A may apply a route map that compares information in the routing communication with the selection criteria. The route map may, for example, compare a BGP community of a BGP packet, a description of an MPLS packet, or IP addresses of an IP packet to the route map logic, i.e., the selection criteria.

When the information in the routing communication does not match the selection criteria of the route map, router 27 may not instantiate a corresponding interface, or may instantiate the interface without requesting QoS information, e.g., interface parameters, from service management system 14 (62, 64). Router 27, for example, may instantiate a default interface with no specific interface parameters, e.g., with default QoS characteristics. Alternatively, router 27 may instantiate an interface with interface parameters stored in service profile data 42 or in an interface characteristic data structure maintained within router 27. In either case, the interface parameters may be pre-configured, e.g., by a system administrator, for each interface and for each router.

When the information in the routing communication matches the selection criteria of the route map, RP process 52A associates the data flow with access information (62, 66). For example, when the results of the route map indicate a match, RP process 52A may associate a service profile name or identification number and, in turn, access information for the defined data flow. RP process 52A may further retrieve access information, such as a user name and password, corresponding to the service profile identifier from access data 42.

Next, router 27 and, more particularly, IC process 52B sends a query with the access information to service management system 14 to retrieve interface parameters that correspond to the service profile identifier associated with the data flow (68). More specifically, the query may include a username and password that service management system 14 will authenticate. The access information may be communicated to IC process 52B by RP process 52A via interprocess communication channel 53A. Alternatively, RP process 52A may only communicate a service profile identifier associated with the data flow to IC process 52B, and IC process 52B may retrieve access information corresponding to the service profile identifier from access data 42.

IC process 52B waits to receive an authentication response from service management system 14. Service management system 14 compares the access information included in the query to a database 24. When the access information of the query matches an entry in database 24, service management system 14 authenticates the query and sends IC process 52B QoS information, such as interface parameters, corresponding to the service profile identifier associated with the data flow.

When IC process 52B receives a response from service management system 14 denying authentication, IC process 52B notifies RP process 52A of the authentication denial and ends the interface instantiation operation (70, 76).

When service management system 14 authenticates the query, IC process 52B receives QoS corresponding to the service profile identifier associated with the data flow (70, 72). As described above, IC process 52B may receive QoS information, such as a dedicated bandwidth, latency, and error rate, and/or specific interface parameters. DCM process 52C dynamically instantiates an interface in accordance with the interface parameters received from the query to service management system 14 (74). For example, DCM process 52C may receive an interface instantiation request from IC process 52B that includes the interface parameters received from the query to service management system 14, and dynamically instantiate a logical interface in accordance with the interface parameters. In the event DCM process 52C cannot instantiate the requested interface, e.g., due to lack of required resources or incorrect parameters, DCM process 52C may return one or more error codes to IC process 52B, and the process terminates.

If the instantiation is successful, DCM process 52C notifies IC process 52B that the interface has been instantiated (76). IC process 52B may relay the notification to RP process 52A, which may update routing information 40 as well as a respective one of forwarding information bases 44 to point to the instantiated interface.

Various embodiments of the invention have been described. Although packet-based networks are described herein, other types of data units may also be used consistent with the principles of the invention. For instance, the term "packet" is used to generally describe a unit of data communicated between resources in conformance with a communication protocol. The principles of the invention may be readily applied to a variety of protocols, such as Transmission Control Protocol (TCP), the Internet Protocol (IP), Multi-protocol Label Switch (MPLS), Asynchronous Transfer Mode (ATM), Frame Relay, and the like. Accordingly, "packet" is used to encompass any such unit of data, and may be interchanged with the term "cell", or other similar terms used in such protocols to describe a unit of data communicated between resources within the network. These and other embodiments are within the scope of the following claims.

The invention claimed is:

1. A method comprising:
   maintaining, within a router, a data structure that associates routes through a network with access information for retrieving interface parameters from an external service management system, wherein the data structure associates service profile identifiers corresponding with respective services provided by the router with the access information;
   receiving, with the router, a routing protocol packet from a second router, wherein the routing protocol packet includes routing information that specifies at least one route through the network;
   selecting, from the data structure, the access information associated with the route specified by the routing information, wherein selecting the access information comprises associating the route with one of the service profile identifiers without specifying an individual user and retrieving access information for the respective service provided by the router based on the service profile identifier associated with the route;
   querying the external service management system with the selected access information to obtain interface parameters for instantiating an interface;
   instantiating at least one interface within the router based on the interface parameters obtained from the external service management system; and
   forwarding data of a data flow associated with the route specified by the routing information with the at least one interface of the router that was instantiated using the interface parameters obtained from the external service management system.

2. The method of claim 1, wherein querying the external service management system with the selected access information to obtain interface parameters for instantiating an interface comprises querying the external service management system with the selected access information to obtain interface parameters for instantiating an interface to support a quality of service (QoS) level.

3. The method of claim 1, wherein querying the external service management system comprises logging into the external service management system with the access information.

4. The method claim 1, wherein each of the respective services is associated with a different QoS level.

5. The method of claim 1, wherein the service profile identifier comprises at least a portion of the access information.

6. The method of claim 1, wherein associating the route with one of the service profile identifiers comprises one of:
   applying route map logic to compare a Border Gateway Protocol (BGP) community of a BGP packet with the selection criteria to associate the route specified by the routing information with the corresponding service profile identifier; or
   applying route map logic to compare a description of a Multiprotocol Label Switching (MPLS) packet with the selection criteria to associate an MPLS path specified by the routing information with the corresponding service profile identifier.

7. The method of claim 1, wherein the access information includes at least one of a username, a password, and a domain associated with a service provided by the router without specifying an individual network user.

8. The method of claim 1, wherein the routing protocol packet specifies at least one route of a virtual private network (VPN).

9. The method of claim 1, wherein querying the service management system comprises querying a Remote Authentication Dial-In User Service (RADIUS) server.

10. The method of claim 1, further comprising:
    receiving, with the router, a second routing protocol packet that specifies a second route through the network;
    selecting, from the data structure, second access information associated with the second route specified by the routing information of the second routing protocol packet;
    querying the external service management system with the second access information to obtain second interface parameters for instantiating a second interface;
    instantiating the second interface within the first router based on the second interface parameters obtained from the external service management system; and
    forwarding data of the second data flow associated with the second route specified by the routing information with the second interface of the first router configured using the second interface parameters, wherein the second data flow and the first data flow are associated with a common virtual private network (VPN) site.

11. The method of claim 10, wherein the first interface parameters support a first quality of service (QoS) level and the second interface parameters support a second QoS level.

12. A network device comprising:
    a control unit that:
    maintains a data structure that associates routes through a network with access information for retrieving interface parameters from an external service management system, wherein the control unit maintains the data structure to associate service profile identifiers corresponding with respective services provided by the network device with access information,
    receives a routing protocol packet from a second router that includes routing information that specifies at least one route through the network,
    associates the route with one of the service profile identifiers,
    selects, from the data structure, the access information associated with the route specified by the routing information by at least retrieving access information for the respective service provided by the router based on the service profile identifier associated with the route, and queries the external service management system with
the selected access information to obtain interface
parameters for instantiating an interface; and an interface through which the control unit forwards data of a data flow associated with the route specified in the routing information, wherein the interface is configured based on the interface parameters obtained from the external service management system.

13. The device of claim 12, wherein the control unit queries the external service management system with the selected access information to obtain interface parameters for instantiating an interface to support a quality of service (QoS) level.

14. The device claim 12, wherein each of the respective services is associated with a different QoS level.

15. The device of claim 12, wherein the control unit associates the route with one of the service profile identifiers by:
   applying route map logic to compare a Border Gateway Protocol (BGP) community of a BGP packet with the selection criteria to associate the route specified by the routing information with the corresponding service profile identifier; or
   applying route map logic to compare a description of a Multiprotocol Label Switching (MPLS) packet with the selection criteria to associate an MPLS path specified by the routing information with the corresponding service profile identifier.

16. The device of claim 12
   wherein the interface comprises a first interface configured based on first interface parameters obtained from the external service management system and through which the control unit forwards data of a first data flow associated with the first route specified in the routing information of the first routing communication packet,
   wherein the control unit receives a second routing protocol packet from the second router that includes routing information that specifies a second route through the network, selects the access information associated with the second route specified by the routing information of the second routing protocol packet, and queries the external service management system with the selected access information to obtain second interface parameters for instantiating a second interface,
   the device further comprising a second interface configured based on the second interface parameters obtained from the external service management system and through which the control unit forwards data of a second data flow associated with the second route specified in the routing information, wherein the second data flow and the first data flow are associated with a common virtual private network (VPN) site.

17. The device of claim 16, wherein the first interface parameters support a first quality of service (QoS) level and the second interface parameters support a second QoS level.

18. The device of claim 12, wherein the access information includes at least one of a username, a password, and a domain associated with a service provided by the router without specifying an individual network user.

19. A computer-readable storage medium encoded with instructions for causing one or more programmable processors to:
   maintain a data structure that associates routes through a network with access information for retrieving interface parameters from an external service management system, wherein the data structure associates service profile identifiers corresponding with respective services provided by the router with the access information;
   receive a routing protocol packet from a router, wherein the routing protocol packet includes routing information that specifies at least one route through the network;
   select, from the data structure, the access information associated with the route specified by the routing information, wherein selecting the access information comprises associating the route with one of the service profile identifiers without specifying an individual user and retrieving access information for the respective service provided by the router based on the service profile identifier associated with the route;
   query the external service management system with the selected access information to obtain interface parameters for instantiating an interface;
   instantiate at least one interface based on the interface parameters obtained from the external service management system; and
   forward data of a data flow associated with the route specified by the routing information with the at least one interface that was instantiated using the interface parameters obtained from the external service management system.

20. The computer-readable medium of claim 19, wherein the instructions for causing the one or more programmable processor to query the external service management system with the selected access information to obtain interface parameters for instantiating an interface further comprise instructions for causing the one or more programmable processors to query the external service management system with the selected access information to obtain interface parameters for instantiating an interface to support a quality of service (QoS) level.

\* \* \* \* \*

UNITED STATES PATENT AND TRADEMARK OFFICE
CERTIFICATE OF CORRECTION

| | |
|---|---|
| PATENT NO. | : 7,747,728 B1 |
| APPLICATION NO. | : 12/195808 |
| DATED | : June 29, 2010 |
| INVENTOR(S) | : Peterson et al. |

It is certified that error appears in the above-identified patent and that said Letters Patent is hereby corrected as shown below:

Column 11, line 66 (claim 4), "The method claim 1" should be -- The method of claim 1 --

Signed and Sealed this
Twenty-seventh Day of March, 2012

David J. Kappos
*Director of the United States Patent and Trademark Office*